United States Patent
Ishiwata et al.

(10) Patent No.: US 11,209,360 B2
(45) Date of Patent: Dec. 28, 2021

(54) COLOR TONE QUANTIFICATION DEVICE FOR GLOSSY COLOR, COLOR TONE MEASUREMENT DEVICE FOR GLOSSY COLOR AND COLOR TONE QUANTIFICATION METHOD FOR GLOSSY COLOR

(71) Applicant: Konica Minolta, Inc., Tokyo (JP)

(72) Inventors: Takumi Ishiwata, Tokyo (JP); Kishio Tamura, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 2 days.

(21) Appl. No.: 16/977,650

(22) PCT Filed: Mar. 15, 2019

(86) PCT No.: PCT/JP2019/010870
§ 371 (c)(1),
(2) Date: Sep. 2, 2020

(87) PCT Pub. No.: WO2019/177153
PCT Pub. Date: Sep. 19, 2019

(65) Prior Publication Data
US 2020/0400565 A1 Dec. 24, 2020

(30) Foreign Application Priority Data
Mar. 16, 2018 (JP) .............................. JP2018-049580

(51) Int. Cl.
*G01N 21/57* (2006.01)
*G01J 3/50* (2006.01)
*G01N 21/27* (2006.01)

(52) U.S. Cl.
CPC .............. *G01N 21/57* (2013.01); *G01J 3/504* (2013.01); *G01N 21/27* (2013.01)

(58) Field of Classification Search
CPC .... G01N 21/57; G01N 2021/575; G01J 3/504
See application file for complete search history.

(56) References Cited

U.S. PATENT DOCUMENTS

| 4,711,580 | A | | 12/1987 | Venable |
| 5,375,193 | A | * | 12/1994 | Adams, Jr. ................ G01J 3/46 |
| | | | | 345/603 |

(Continued)

FOREIGN PATENT DOCUMENTS

| EP | 2703794 A1 | 3/2014 |
| JP | 2002-228522 A | 8/2002 |

(Continued)

OTHER PUBLICATIONS

Okazawa et al.; "Categorical properties of the color term "Gold""; Journal of Vision; vol. 11; 2011; 19 pages.

(Continued)

*Primary Examiner* — Maurice C Smith
(74) *Attorney, Agent, or Firm* — BakerHostetler

(57) ABSTRACT

A color tone quantification device for a glossy color, in which the correlation with the color tone of the glossy color visually perceived by humans is further enhanced, is provided. The device comprises a coefficient calculation unit that calculates a coefficient calculated in consideration of a spatial distribution which is to be used to correct the chromaticity measured by a method including a specular reflection component obtained by measuring the reflection light obtained by reflection of measurement light to an area of an object; a chromaticity calculation unit that calculates an effective chromaticity obtained by weighting the chromaticity measured by the method including the specular reflection component with the coefficient calculated by the coefficient calculation unit; and an output unit that outputs (Continued)

the effective chromaticity as a stimulus value representing a glossy color of the area in a color space.

12 Claims, 10 Drawing Sheets

(56) References Cited

U.S. PATENT DOCUMENTS

| | | | | |
|---|---|---|---|---|
| 5,850,472 | A * | 12/1998 | Alston | G01J 3/524 |
| | | | | 382/162 |
| 7,679,747 | B2 * | 3/2010 | Kuwada | G01N 21/57 |
| | | | | 356/445 |
| 10,302,562 | B2 * | 5/2019 | Kawano | G01J 3/50 |
| 10,497,106 | B2 * | 12/2019 | Yamamoto | G06T 5/004 |
| 2016/0025629 | A1 | 1/2016 | Kettler et al. | |

FOREIGN PATENT DOCUMENTS

| | | |
|---|---|---|
| JP | 2010-243353 | 10/2010 |
| JP | 2010-243353 A | 10/2010 |
| JP | 2014-077664 A | 5/2014 |
| JP | 2015-068813 A | 4/2015 |
| JP | 2016-114598 A | 6/2016 |

OTHER PUBLICATIONS

Matsumoto et al.; "Appearance of Gold, Silver and Copper Colors of Glossy Object Surface"; Int'l Journal of Affective Engineering; vol. 15; 2016; p. 239-247.
International Patent Application No. PCT/JP2019/010870; Int'l Written Opinion and Search Report; dated Jun. 11, 2019; 8 pages.
European Patent Application No. 19767414.6; Extended Search Report; dated Apr. 6, 2021; 10 pages.
International Search Report issued in PCT/JP2019/010870, dated Jun. 11, 2019.
Matsumoto et al., "Appearance of Gold, Silver and Copper Colors of Glossy Object Surface," International Journal of Affective Engineering, vol. 15(3), pp. 239-247 (2016).
Okazawa et al., "Categorical Properties of the Color Term Gold," Journal of Vision, vol. 11(8), pp. 1-19 (2011).

* cited by examiner

US 11,209,360 B2

COLOR TONE QUANTIFICATION DEVICE FOR GLOSSY COLOR, COLOR TONE MEASUREMENT DEVICE FOR GLOSSY COLOR AND COLOR TONE QUANTIFICATION METHOD FOR GLOSSY COLOR

The present U.S. Patent Application is a U.S. National Phase Application under 35 U.S.C. 371 of International Application PCT/JP2019/010870 filed on Mar. 15, 2019, which claims priority to Japanese Patent Application No. 2018-049580 filed on Mar. 16, 2018, the entire disclosures of which are incorporated herein by reference in their entireties.

TECHNICAL FIELD

The present invention relates to a color tone quantification apparatus for a glossy color, a color tone measurement apparatus for a glossy color, and a color tone quantification method for a glossy color.

BACKGROUND ART

When an image used for labels, packages, printed public notices, or the like is produced, it is desirable that a customer that determines a color tone or the like of the image and a contractor that produces the image having the determined color tone can have the common recognition regarding the to-be-expressed color tone or the like of the image. For example, information regarding a color tone expresses the color tone or the like of the image as numerical values of L*, a*, and b* in the CIELab color space and numerical values of R, G, and B in the RGB color model. The information can be transmitted and shared between the involving parties.

When an image having a metallic gloss is produced, it is desirable that information regarding differences in color tone among different colors having metallic glosses such as bluish gold, reddish gold, and matte gold is similarly transmitted and shared between the involving parties.

As a method for converting a color tone of an image having a metallic gloss into numerical values, PTL 1 describes a method for using, as a glossiness evaluation value of an object, a value that is obtained by multiplying, by coefficients determined in advance from a subjective evaluation experiment, a glossiness fluctuation evaluation value (such as a standard deviation of the lightness) based on a lightness component calculated from R, G, and B values of light of specular reflection from the object and a glossiness fluctuation evaluation value (such as a ratio between lightness average values) based on lightness components obtained from the R, G, and B values of the light of specular reflection and R, G, and B values of light of diffuse reflection from the object and by adding these products. In addition, NPL 1 describes that a metallic gloss of gold, silver, copper, or the like is a color tone included in a specific region in a CIE xy chromaticity diagram in the case of high specular reflectance. In addition, NPL 2 describes that the appearance of a metallic gloss of gold, silver, copper, or the like is determined by the chromaticity range, the contrast glossiness, and the luminance contrast of an image.

CITATION LIST

Patent Literatures

PTL 1: Japanese Patent Application Laid-Open No. 2010-243353

Non Patent Literatures

NPL 1: Okazawa et al., "Categorical properties of the color term "GOLD"", Journal of Vision, Vol. 11(8), 2011, pp. 1-19

NPL 2: Matsumoto et al., "Appearance of Gold, Silver and Copper Colors of Glossy Object Surface", International Journal of Affective Engineering, Vol. 15(3), 2016, pp. 239-247

SUMMARY OF INVENTION

Technical Problem

As described above, various methods for converting the appearance of a metallic gloss into numerical values have been proposed. However, it cannot be said that these methods can fully express, through obtained values, the glossiness which persons feel with their eyes since a correlation between the obtained values and the color tone of the glossy color which the persons feel with their eyes is not so high.

The present invention is made in view of the problem described above, and an object thereof is to provide a color tone quantification method for a glossy color that increases a correlation with a color tone of a glossy color which a person feels with their eyes, an apparatus that quantifies a color tone of a glossy color using the method, an apparatus that quantifies and measures a color tone of a glossy color using the method, and an apparatus that forms an image using a stimulus value representing a quantified color tone.

Solution to Problem

A color tone quantification apparatus for a glossy color for solving the problem mentioned above comprises: a coefficient calculation section that calculates a coefficient for use in correction of chromaticity measured in a mode including a specular reflection component, the chromaticity being obtained from measurement of reflected light that is measurement light which a region of an object is irradiated with and which is reflected off the region, the coefficient being calculated in consideration of a spatial distribution of the reflected light; a chromaticity calculation section that calculates effective chromaticity that is the chromaticity measured in the mode including the specular reflection component weighted by the coefficient calculated by the coefficient calculation section; and an output section that outputs the effective chromaticity as a stimulus value representing a glossy color of the region in a color space.

A color tone measurement apparatus for a glossy color for solving the problem mentioned above comprises: a goniophotometer that measures, at a plurality of light reception angles different from one another, radiant intensities of reflected light that is measurement light which a region of an object is irradiated with and which is reflected off the region; a colorimeter that measures chromaticity of the region onto which the measurement light is incident in the object; and the color tone quantification apparatus for a glossy color according to any one of claims 1 to 10.

A color tone quantification method for a glossy color for solving the problem mentioned above comprises: calculating a coefficient for use in correction of chromaticity measured in a mode including a specular reflection component, the chromaticity being obtained from measurement of reflected light that is measurement light which a region of an object is irradiated with and which is reflected off the region, the coefficient being calculated in consideration of a spatial distribution of the reflected light; calculating effective chromaticity that is the chromaticity measured in the mode including the specular reflection component weighted by the coefficient calculated in the calculating of the coefficient; and outputting the effective chromaticity as a stimulus value representing a glossy color of the region in a color space.

Advantageous Effects of Invention

The present invention provides a color tone quantification method for a glossy color that increases a correlation with a color tone of a glossy color which a person feels with their eyes, an apparatus that quantifies a color tone of a glossy color using the method, an apparatus that quantifies and measures a color tone of a glossy color using the method, and an apparatus that forms an image using a stimulus value representing a quantified color tone.

DESCRIPTION OF EMBODIMENTS

First Embodiment

Figure 1:
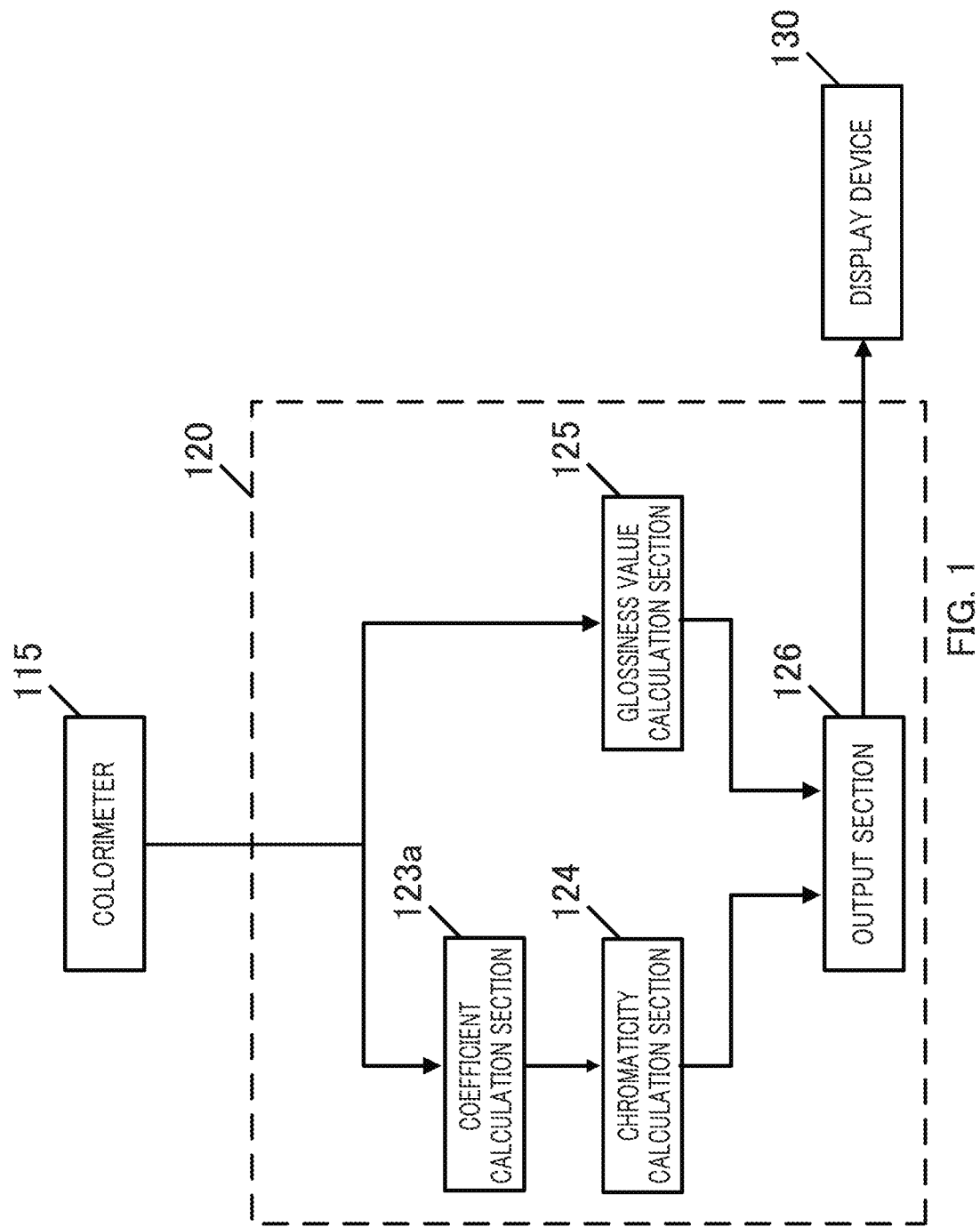
FIG. 1 is a block diagram illustrating an overview of a color tone measurement apparatus for a glossy color according to a first embodiment of the present invention.
Figure 2:
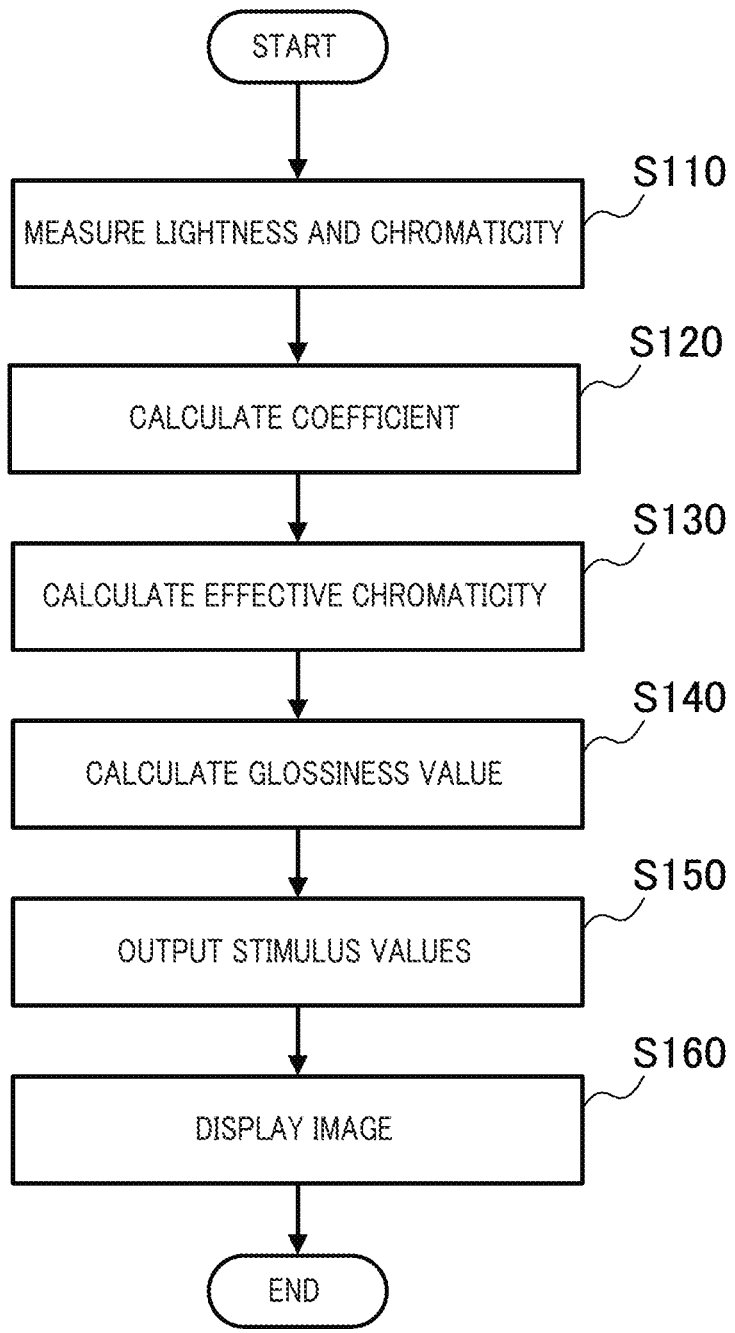
FIG. 2 is a flowchart of a method for measuring a color tone of a sample using the color tone measurement apparatus for a glossy color according to the first embodiment of the present invention.

FIG. 1 is a block diagram illustrating an overview of color tone measurement apparatus 100 for a glossy color according to a first embodiment of the present invention. FIG. 2 is a flowchart of a method for quantifying a color tone of a glossy color of a sample using color tone measurement apparatus 100 according to the first embodiment.

Color tone measurement apparatus 100 includes colorimeter 115, color tone quantification apparatus 120 for a glossy color, and display device 130.

Color tone measurement apparatus 100 includes, for example, a CPU (Central Processing Unit) serving as a processor, a storage medium such as a ROM (Read Only Memory) storing a control program, a work memory such as a RAM (Random Access Memory), and a communication circuit, which are not illustrated. In this case, functions of color tone measurement apparatus 100 are implemented by the CPU executing the control program. At least part of a program causing color tone measurement apparatus 100 to execute a process is stored on a server. At least part of the program may be stored on a cloud server.

A sample which is an object for which a color tone of a glossy color is quantified and measured may be any object that has a certain shape or an indefinite shape and that can reflect at least part of measurement light. The sample may be a molded article having the color tone of the material thereof or an image formed article obtained by giving the color tone to a molded body using colorant.

Colorimeter 115 measures the lightness and the chromaticity of reflected light which is measurement light that is reflected off a region having the certain color tone in the sample after being incident onto the region (step S110).

The lightness obtained by colorimeter 115 can be expressed by L* in the CIE 1976 (L*, a*, u*) color space, L* in the CIE 1976 (L*, u*, v*) color space, L in the Hunter 1948 L, a, b color space, a value of the Y component in the CIE 1931 XYZ color space, or the like. From the viewpoint of increasing a correlation with the glossiness which a person feels with their eyes, a value representing the chromaticity based on the psychometric quantity corrected to match the perception of a person, such as L* in the CIE 1976 (L*, a*, b*) color space, is preferably used.

The chromaticity obtained by colorimeter 115 is expressed by stimulus values indicating components other than the lightness or luminance in the color system and can be expressed by chromaticity indices such as a* and b* in the CIE 1976 (L*, a*, b*) color space, u* and v* in the CIE 1976 (L*, u*, v*) color space, a and b in the Hunter 1948 L, a, b color space, or values of the X component and the Z component in the CIE 1931 XYZ color space. From the viewpoint of increasing a correlation with the glossiness which a person feels with their eyes, values representing the chromaticity based on the psychometric quantity corrected to match the perception of a person, such as a* and b* in the CIE 1976 (L*, a*, b*) color space, are preferably used.

In the present embodiment, L* in the CIE 1976 (L*, a*, b*) color space is used as the lightness, and a* and b* in the CIE 1976 (L*, a*, b*) are used as the chromaticity. In the present embodiment, the lightness and the chromaticity measured in a mode (for example, SCI) including a specular reflection component are also hereinafter referred to as $L^*_I$ and $a^*_I$ and $b^*_I$, respectively, and the lightness and the chromaticity measured in a mode (for example, SCE) excluding the specular reflection component are also hereinafter referred to as $L^*_E$ and $a^*_E$ and $b^*_E$, respectively.

Colorimeter 115 may be a colorimeter based on spectrophotometric colorimetry or a colorimeter based on photoelectric tristimulus colorimetry. In addition, colorimeter 115 is a colorimeter that includes an integrating sphere or the like and obtains both the chromaticity measured in a mode including light of specular reflection after being incident onto an object (hereinafter, simply referred to as "specular reflection component") among reflected light and the chromaticity measured in a mode excluding the specular reflection component.

The use of the chromaticity measured in the mode excluding the specular reflection component is usually preferable when the chromaticity of a color is expressed since the chromaticity is likely to match the perception of a person. However, glossy colors reflect, with directivity, more light that is incident onto an object as specular reflection than ordinary colors. Therefore, it is considered that the directivity occurs in the spatial distribution of the light that is reflected off the glossy color and is perceived, and that an influence of this directivity on the color tone of the glossy color which a person feels with their eyes is large. Specifically, since most of light reflected off a sample having a glossy color is specular reflection, most of hue information of the sample is collected in light of specular reflection. Thus, according to the knowledge of the inventors, it is considered that the use of the chromaticity measured in the mode including the specular reflection component is appropriate when the color tone of the glossy color is quantified.

The inventors have conceived that, by correcting the chromaticity measured in the mode including the specular reflection component so as to be able to take into account the hue information included in the diffuse reflection component for a low gloss sample, the color tone of a glossy color can be quantified so as to represent both the color tone perceived for the high gloss sample and the color tone perceived for the low gloss sample. That is, the inventors have conceived that effective chromaticity with an increased correlation with the color tone of a glossy color which a person feels with their eyes can be calculated by weighting the chromaticity measured in the mode including the specular reflection component by a coefficient that takes into account a spatial distribution of reflected light that is reflected off the sample, specifically, a coefficient calculated so that the weight value decreases when the reflected light includes more specular reflection component and increases when the reflected light includes more diffuse reflection component, and have found that weighting described in detail later is suitable.

Color tone quantification apparatus 120 includes processing sections such as coefficient calculation section 123a, chromaticity calculation section 124, glossiness value calculation section 125, and output section 126. Color tone quantification apparatus 120 includes, for example, a CPU (Central Processing Unit) serving as a processor, a storage medium such as a ROM (Read Only Memory) storing a control program, a work memory such as a RAM (Random Access Memory), and a communication circuit, which are not illustrated. In this case, functions of color tone quantification apparatus 120 are implemented by the CPU executing the control program. At least part of a program causing color tone quantification apparatus 120 to execute a process is stored on a server. At least part of the program may be stored on a cloud server. Color tone quantification apparatus 120 also includes a reception section (not illustrated) that receives a signal transmitted from colorimeter 115 and a transmission section (not illustrated) that transmits a signal generated by output section 126 to display device 130.

Coefficient calculation section 123a calculates the coefficient used in the weighting (step S120). In the present embodiment, coefficient calculation section 123a determines, as the coefficient used in the weighting of the chromaticity, a value expressed by $(1+(L^*_I+L^*_E)/(2\times L^*_{MAX}))$ using the lightness $(L^*_I)$ measured by colorimeter 115 in the mode including the specular reflection component, the lightness $(L^*_E)$ measured by colorimeter 115 in the mode excluding the specular reflection component, and an expected maximum value $(L^*_{max})$ of the lightness. Note that the value of $L^*_{max}$ may be any value and can be, for example, 100.

Chromaticity calculation section 124 calculates values expressed by expression (1) and expression (2) below using the coefficient calculated by coefficient calculation section 123a and uses these values as the effective chromaticity $a^*_{eff}$ and $b^*_{eff}$ (step S130).

[Math. 1]
$$a^*_{eff} = a^*_I\left(1 + \frac{L^*_I + L^*_E}{2\times L^*_{MAX}}\right) \quad \text{Expression (1)}$$

[Math. 2]
$$b^*_{eff} = b^*_I\left(1 + \frac{L^*_I + L^*_E}{2\times L^*_{MAX}}\right) \quad \text{Expression (2)}$$

The effective chromaticity thus determined is close to 1 in a high gloss region since $L^*_E$ is small and the correction coefficient (the numerical value in the parentheses) does not become so large. Conversely, in a low gloss region, since both $L^*_I$ and $L^*_E$ take values of some significance, the correction coefficient (the numerical value in the parentheses) becomes relatively large. In this way, the effective chromaticity can be calculated in a manner such that hue information included in light of specular reflection is indicated in a relatively as-is state for a high gloss region and hue information included in the diffuse reflection component is also taken into consideration for a low gloss region.

Glossiness value calculation section 125 calculates a glossiness value in the region of the sample for which colorimeter 115 have measured the lightness and the coloring agent (step S140). Glossiness value calculation section 125 may calculate, as the glossiness value, the luminance or lightness measured by colorimeter 115 in the region, such as the lightness (L*) in the CIE 1976 (L*, a*, b*) color space, the lightness (L) in the Hunter 1948 L, a, b color space, and the value of the Y component in the CIE 1931 XYZ color space. Alternatively, glossiness value calculation section 125 may calculate, as the glossiness value, the reflection intensity of the specular reflection component (light reception angle of 45°) calculated by a goniopenetrometer not illustrated, the specular glossiness defined by JIS Z 8741, and the magnitude relationship, the average value, the standard deviation, or the like of reflectances, luminances, or lightnesses at a plurality of light reception angles. Glossiness value calculation section 125 may calculate the glossiness value corrected using a known method.

Output section 126 combines the effective chromaticity calculated by chromaticity calculation section 124 and the glossiness value calculated by glossiness value calculation section 125 and outputs the combination of these as a set of stimulus values representing a glossy color in a color space having coordinate axes representing the chromaticity and the glossiness (step S150). Output section 126 also converts the numerical values into a signal that can be communicated with a device external to color tone quantification apparatus 120.

Specifically, output section 126 uses the effective chromaticity $a^*_{eff}$ and $b^*_{eff}$ calculated by chromaticity calculation section 124 as stimulus values representing the chromaticity and the glossiness value calculated by glossiness value calculation section 125 as a stimulus value representing the glossiness to calculate the tristimulus values in the color space.

Figure 3:
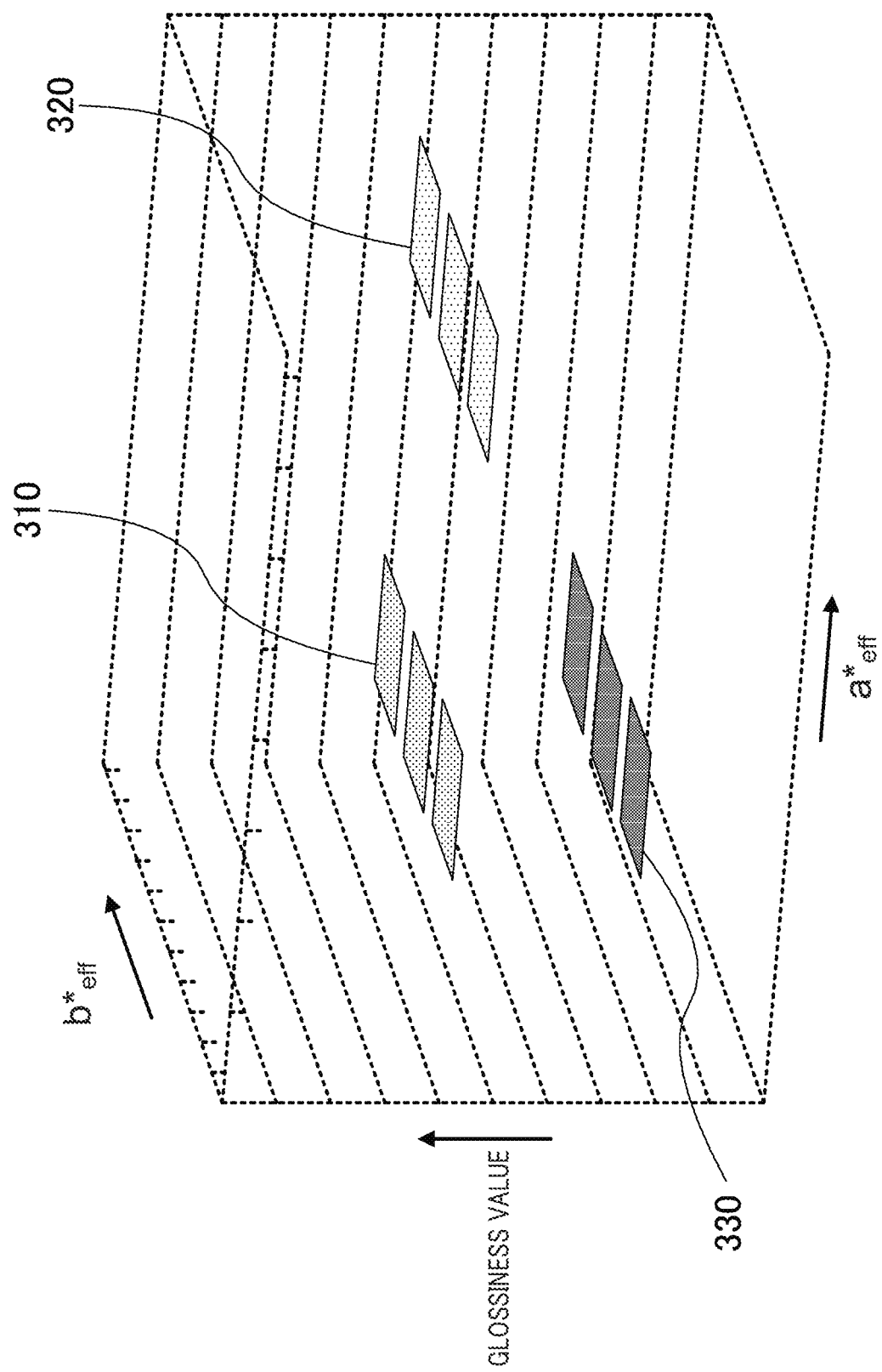
FIG. 3 is a conceptual diagram illustrating a color space that is obtained in the first embodiment of the present invention and that has coordinate axes representing chromaticity and glossiness.

FIG. 3 is a conceptual diagram illustrating a color space having coordinate axes representing the chromaticity and the glossiness. In this color space, metallic glosses having different color tones (for example, bluish gold 310, reddish gold 320, and matte gold 330) are expressed as color tones having stimulus values different from one another.

Output section 126 also generates a signal that includes information regarding the glossy color and is to be used for reproducing an image having the tristimulus values on a display device. The generated signal is transmitted from the transmission section of color tone quantification apparatus 120 to display device 130.

Display device 130, which is a display device such as a smartphone, a PC, or a TV, displays an image having the tristimulus values included in the signal generated by output section 126 on a display (step S160). The displayed image makes it easier, for example, when an image used for labels, packages, printed public notices, or the like is produced, for a customer that determines a color tone or the like of the image and a contractor that produces the image having the determined color tone to have the common recognition regarding the to-be-expressed color tone or the like of the image.

According to the present embodiment, since the chromaticity based on the mode including the specular reflection component is weighted in consideration of the spatial distribution of reflected light, the effective chromaticity with an increased correlation with the color tone of a glossy color which a person feels with their eyes can be calculated.

Second Embodiment

Figure 4:
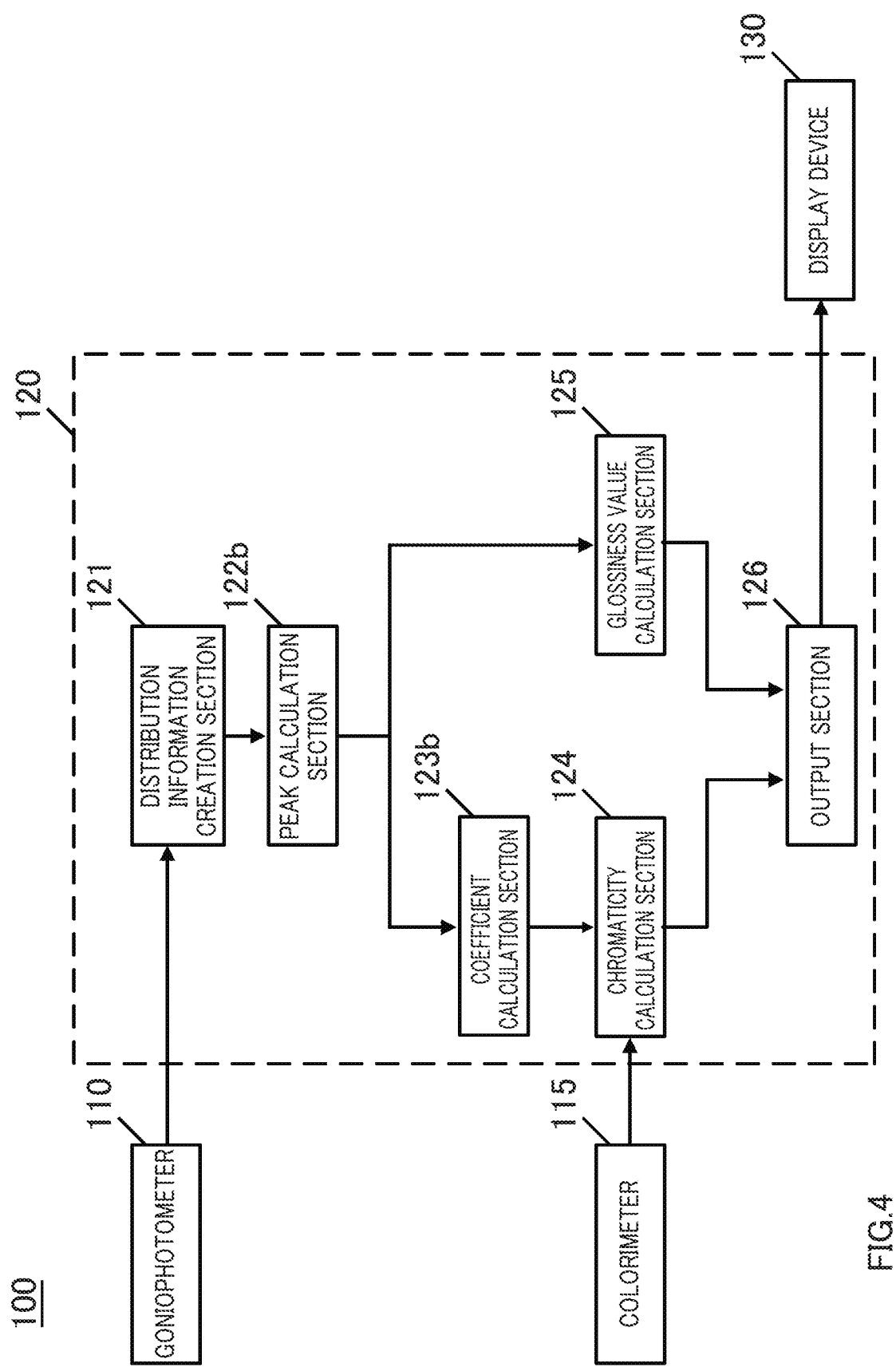
FIG. 4 is a block diagram illustrating an overview of a color tone measurement apparatus for a glossy color according to a second embodiment of the present invention.
Figure 5:
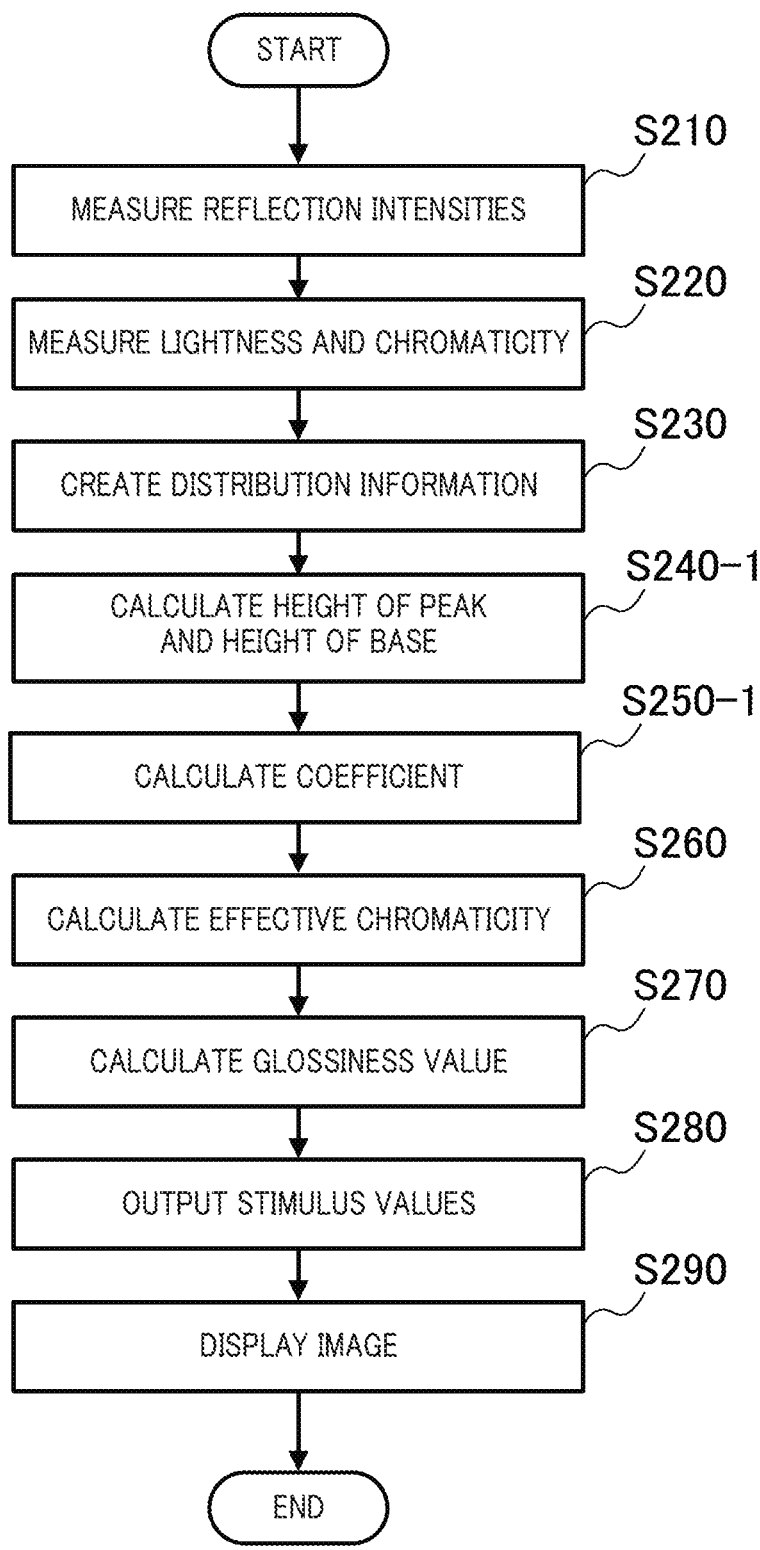
FIG. 5 is a flowchart of a method for measuring a color tone of a sample using the color tone measurement apparatus for a glossy color according to the second embodiment of the present invention.

FIG. 4 is a block diagram illustrating an overview of color tone measurement apparatus 100 for a glossy color according to a second embodiment of the present invention. Color tone measurement apparatus 100 includes goniophotometer 110, colorimeter 115, color tone quantification apparatus 120 for a glossy color, and display device 130. FIG. 5 is a flowchart of a method for quantifying a color tone of a glossy color of a sample using color tone measurement apparatus 100 according to the second embodiment.

In the present embodiment, color tone quantification apparatus 120 includes processing sections such as distribution information creation section 121, peak calculation section 122$b$, coefficient calculation section 123$b$, chromaticity calculation section 124, glossiness value calculation section 125, and output section 126. Color tone quantification apparatus 120 includes, for example, a CPU (Central Processing Unit) serving as a processor, a storage medium such as a ROM (Read Only Memory) storing a control program, a work memory such as a RAM (Random Access Memory), and a communication circuit, which are not illustrated. In this case, functions of color tone quantification apparatus 120 are implemented by the CPU executing the control program. At least part of a program causing color tone quantification apparatus 120 to execute a process is stored on a server. At least part of the program may be stored on a cloud server. Color tone quantification apparatus 120 also includes a reception section (not illustrated) that receives a signal transmitted from goniophotometer 110 and colorimeter 115 and a transmission section (not illustrated) that transmits a signal generated by output section 126 to display device 130.

Note that functional sections having substantially the same functions as those of the first embodiment are denoted by the same reference signs to omit duplicate description.

As described above, most of hue information of the sample is collected in light of specular reflection. It is considered that the color tone of the glossy color which a person feels with their eyes is influenced by a degree to which the lightness or reflection intensity of the reflected light is collected and densely distributed to the angle of specular reflection (directivity of the spatial distribution). Thus, it is considered that, by measuring the spatial distribution of the reflected light using goniophotometer 110 and weighting the chromaticity based on the mode including the specular reflection component in consideration of the directivity of the measured spatial distribution, the effective chromaticity with an increased correlation with the color tone of the glossy color which a person feels with their eyes can be calculated in the present embodiment.

Goniophotometer 110 measures, at a plurality of different light reception angles, radiant intensities of reflected light which is measurement light that is reflected off a region having a certain color tone in a sample after being incident onto the region (step S210). Goniophotometer 110 includes a stage on which a sample is placed, a light source that emits measurement light, an optical system through which the sample placed on the stage is irradiated with the measurement light emitted by the light source, and a light receiver that measures radiant intensity of reflected light which is reflected off the sample placed on the stage after the sample is irradiated with (none of the components are illustrated). Goniophotometer 110 rotates the stage on which the sample is placed and changes, in synchronization with the rotation, the angle at which the sample is irradiated with the measurement light or the angle of the light receiver with respect to the sample placed on the stage to measure, at a plurality of different light reception angles, radiant intensities of the reflected light for the measurement light that is incident at a certain incident angle. The radiant intensities of the reflected light may be measured in a two-dimensional distribution (such as an angle [deg] and a plane angle [rad]) of the light reception angle, or may be measured in a three-dimensional distribution (such as a solid angle [st] and a square degree [deg$^2$]) of the light reception angle.

The angle at which the measurement light is incident onto the sample can be set to any value. In consideration of the case where measurement is performed on a sample for which the Fresnel reflectance is dependent on the incident angle, the incident angle is preferably set to be greater than or equal to 30° and less than or equal to 60°, which is an angle range in which a fluctuation in reflectance depending on the incident angle is small.

The range of the light reception angle may be set to a range including angles at which at least reflected light of specular reflection at the sample can be received and angles at which at least part of reflected light of diffuse reflection at the sample can be received. For example, the range of the light reception angle may be about −20° to 80° in the case where the incident angle is 45°. Even at 0° to 60°, the glossiness value with an increased correlation with the glossiness which a person feels with their eyes can be calculated. Intervals between the plurality of different light reception angles may be any range that enables a sufficient number of radiant intensities to be obtained so that distribution information for use in processing described later can be obtained.

Goniophotometer 110 transmits, through the communication circuit, data of the plurality of different light reception angles and of the radiant intensities measured at the respective light reception angles to color tone quantification apparatus 120.

Colorimeter 115 measures the lightness and the chromaticity of the reflected light which is the measurement light that is reflected off the region of the sample in which goniophotometer 110 has measured the radiant intensities in the sample after being incident onto the region (step S220).

Distribution information creation section 121 creates distribution information of the lightness or the reflection intensity (reflectance or luminance), based on the data that is transmitted from goniophotometer 110 and is received by the reception section of color tone quantification apparatus 120 and that is of the plurality of different reception light angles and the radiant intensities measured at the respective light reception angles (step S230). This distribution information represents the directivity of the spatial distribution.

The distribution information can be expressed as a graph in which the light reception angle is plotted with respect to the horizontal axis and the lightness or reflection intensity is plotted with respect to the vertical axis.

Figure 6:
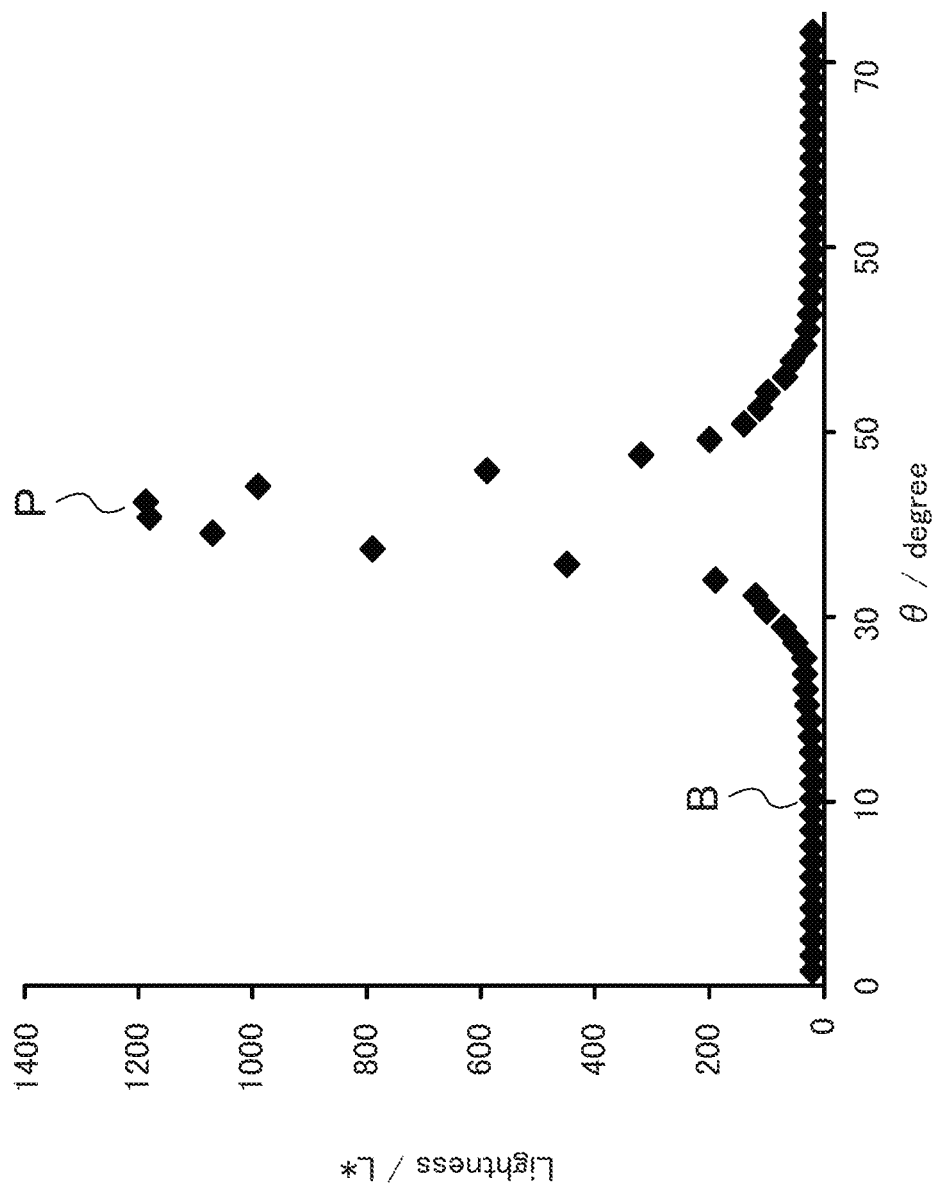
FIG. 6 is an example of a graph that represents distribution information created by a distribution information creation section in the second embodiment of the present invention and in which the light reception angle (θ) and the lightness (L*) are plotted with respect to the horizontal axis and the vertical axis, respectively.

FIG. 6 is an example of a graph that represents the distribution information created by the distribution information creation section 122 in the present embodiment and in which the light reception angle (θ) and the lightness (L*) are plotted with respect to the horizontal axis and the vertical axis, respectively. The lightness (L*) in the CIE 1976 (L*, a*, b*) color space is used for the vertical axis in FIG. 6. Alternatively, the lightness (L) in the Hunter 1948 L, a, b color space, the value of the Y component in the CIE 1931 XYZ color space, or the like may be used as the lightness for the vertical axis, or the reflection intensity (or luminance) of the measurement light may be used for the vertical axis. Among these, from the viewpoint of increasing a correlation with the glossiness which a person feels with their eyes, a value representing the lightness based on the psychometric quantity corrected to match the perception of the person, such as the lightness (L*) in the CIE 1976 (L*, a*, b*) color space, is preferably used. The distribution information creation section 122 can calculate these lightness and reflection intensity from the radiant intensities and the intensity of the measurement light using a known method.

In the present embodiment, distribution information creation section 121 creates distribution information of the lightness (L*) in the CIE 1976 (L*, a*, b*) color space.

When the region of the sample irradiated with the measurement light has a gloss, a peak P of the lightness or reflection intensity derived from the reflected light of specular reflection at the region and a base B derived from the reflected light of diffuse reflection at the region appear in the distribution information as illustrated in FIG. 6.

Peak calculation section 122b calculates the height and the spread of the peak P of the lightness or reflection intensity in the distribution information created by distribution information creation section 121 (step S240-1).

The height of the peak P may be a value of the lightness or reflection intensity (height of the peak in the graph) at the light reception angle corresponding to the peak P. The spread of the peak P described above is usually a value determined in consideration of the height of the base B, such as by setting the half-value width based on the height of the peak P relative to the height of the base B, for example. Accordingly, from the viewpoint of achieving matching with the spread of the peak P, the height of the peak P is preferably a difference between the value of the lightness or reflection intensity at the peak P and the value of the lightness or reflection intensity at the base B.

The spread of the peak P may be a half-value width including the half width at half maximum and the full width at half maximum of the peak P, or may be an interval between a plurality of inflection points that appear at different light reception angles in expression obtained by fitting a polynomial function to the distribution information.

Figure 7:
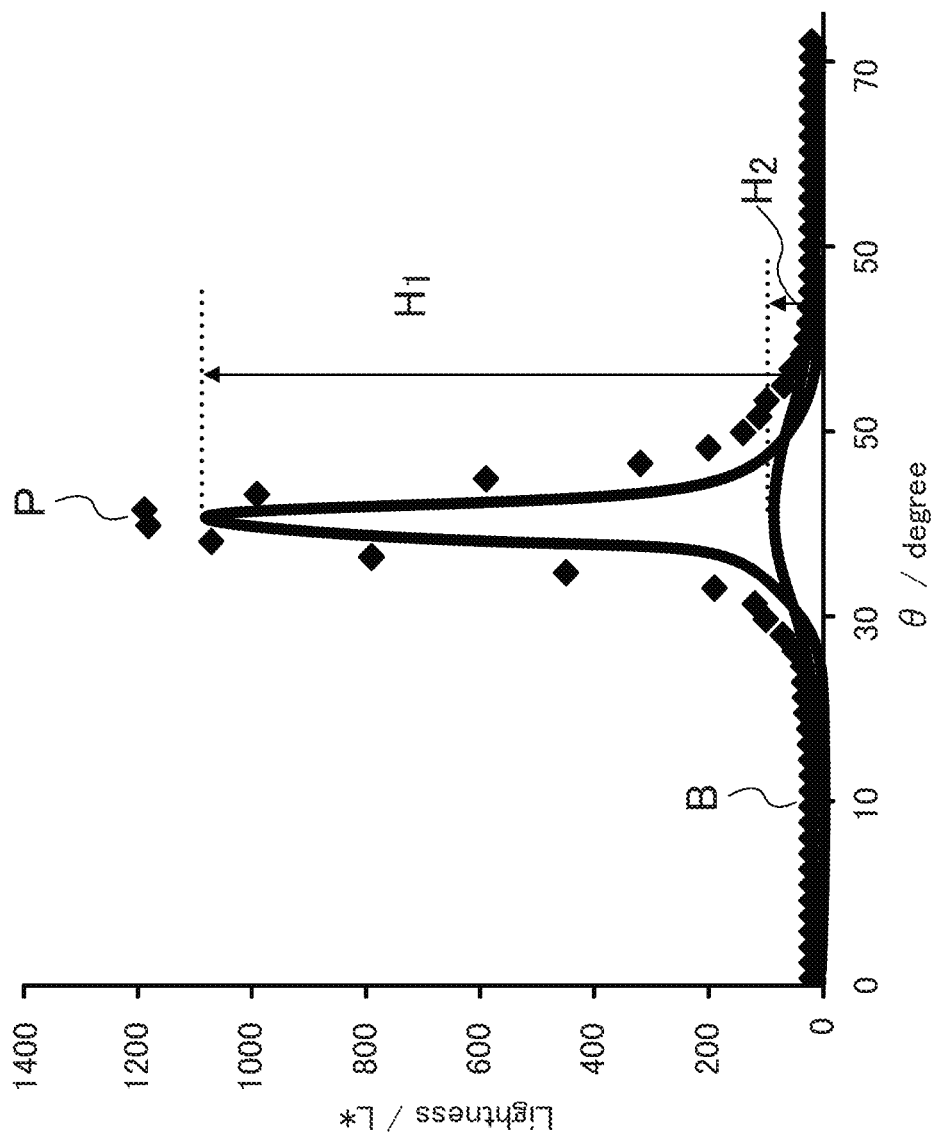
FIG. 7 is a graph illustrating a state in which functions are fitted to the graph illustrated in FIG. 6.

In the present embodiment, peak calculation section 122b calculates the height and the spread of the peak P by fitting the distribution information to two functions (see FIG. 7). The functions may be any continuous functions that are usually used for fitting to the peak shape in a spectrum, and can be functions such as a Lorentz function, a Gaussian function, a Voigt function, and a pseudo-Voigt function, for example. As these functions, functions that well match the peak shape may be selected in accordance with the shape of the peak P. For example, according to the knowledge of the inventors, since a peak obtained by performing measurement on a sample having strong glossiness has a mountain-like shape with a certain base shape, the Lorentz function that well matches the base shape as well is preferable. In addition, since a peak obtained by performing measurement on a sample such as a mirror has a peak shape close to the bell shape, the Gaussian function that well matches the bell shape or the Voigt function or pseudo-Voigt function that has an intermediate shape between those of the Lorentz function and the Gaussian function is preferable.

The two functions may be a combination of different functions such as a combination of a Gaussian function and a Lorentz function. From the viewpoint of sufficiently reflecting the region of the base B based on the light of diffuse reflection as well, a combination of two Lorentz functions is preferable.

In the present embodiment, peak calculation section 122b uses a Lorentz function expressed by expression (3) below.

[Math. 3]

$$f(x) = \frac{H}{1 + \left(\frac{x - x_s}{\frac{W}{2}}\right)^2} + B \qquad \text{Expression (3)}$$

In expression (3), a constant H represents the height (the value of the lightness or reflection intensity) of the peak P relative to the base B, a constant $x_s$ represents a peak position (usually the specular reflection angle), a constant W represents a half-value width (the value of the lightness or reflection intensity), and a constant B represents the height (B) of the base B. In addition, in expression (3), a variable x represents the light reception angle.

In the present embodiment, peak calculation section 122b may fit the distribution information to the two functions, and estimate the constants H, $x_s$, and W in each of the functions using the least squares method, the maximum likelihood estimation, and the like so that a deviation between the combined value of the two functions and the actually measured distribution information (see FIG. 6) decreases. Note that Bs in the respective functions are adjusted to be the same value. Alternatively, the constants H, $x_s$, W, and B may be estimated using software included in a commercial software package, such as Solver (registered trademark) included in Microsoft Excel (registered trademark).

Coefficient calculation section 123b and chromaticity calculation section 124 correct the chromaticity that is transmitted from colorimeter 115 and received by the reception section of color tone quantification apparatus 120, using the height (H) of the peak relative to the base B calculated by the peak calculation section and the height (B) of the base.

Specifically, coefficient calculation section 123b calculates a coefficient for used in correction (weighting) of the chromaticity, using the estimated constants H and B in each of the two functions (step S250-1).

In the present embodiment, coefficient calculation section 123b calculates, as the coefficient, a value expressed by $(1+H_2/(H_1+H_2+B))$ by using H (referred to as $H_1$) estimated using a function that makes the estimated height H of the peak P higher, H (referred to as $H_2$) estimated using a function that makes the estimated height H of the peak P lower, and the height (B) of the base.

Chromaticity calculation section 124 weights, based on the coefficient calculated by coefficient calculation section 123b, the chromaticity measured by colorimeter 115 to calculate the effective chromaticity for the object subjected to the measurement. Also in the present embodiment, the effective chromaticity is represented as $a^*_{eff}$ and $b^*_{eff}$ which are values of a* and b* in the CIE 1976 (L*, a*, b*) color space (step S260).

Specifically, chromaticity calculation section 124 calculates values expressed by expression (4) and expression (5) below using the coefficient calculated by coefficient calculation section 123b from the heights $H_1$ and $H_2$ of the peak calculated by peak calculation section 122b and the height (B) of the base.

[Math. 4]

$$a^*_{eff} = a^*_i\left(1 + \frac{H_2}{H_1 + H_2 + B}\right) \quad \text{Expression (4)}$$

[Math. 5]

$$b^*_{eff} = b^*_i\left(1 + \frac{H_2}{H_1 + H_2 + B}\right) \quad \text{Expression (5)}$$

It is considered that $H_2$ reflects the glossiness (height of the base portion) in the non-peak base portion in the distribution information. Therefore, the effective chromaticity thus determined is close to 1 in a high gloss region since the peak shape becomes sharper and the height of the base portion decreases and, consequently, the correction coefficient (the numerical value in the parentheses) does not become so large. Correction is performed in the above-described manner for the high gloss region so that the chromaticity measured in the mode including the specular reflection component is indicated as it is. Consequently, the influence of light of specular reflection in which much of hue information is collected can be reflected in the chromaticity as it is. Conversely, in a low gloss region, since the height of the base portion takes a value of some significance, the correction coefficient (the numerical value in the parentheses) becomes relatively large. In this way, the effective chromaticity can be calculated in a manner such that hue information included in light of specular reflection is indicated for a high gloss region and hue information included in the diffuse reflection component is also taken into consideration for a low gloss region.

Thereafter, glossiness value calculation section 125 calculates a glossiness value in the region of the sample for which colorimeter 115 have measured the lightness and the coloring agent (step S270).

Then, output section 126 combines the effective chromaticity calculated by chromaticity calculation section 124 and the glossiness value calculated by glossiness value calculation section 125 and outputs the combination of these as a set of stimulus values representing a glossy color in a color space having coordinate axes representing the chromaticity and the glossiness (step S280). Output section 126 also converts the numerical values into a signal that can be communicated with a device external to color tone quantification apparatus 120. Output section 126 also generates a signal that includes information regarding the glossy color and is to be used for reproducing an image having the tristimulus values on a display device. The generated signal is transmitted from the transmission section of color tone quantification apparatus 120 to display device 130.

Lastly, display device 130, which is a display device such as a smartphone, a PC, or a TV, displays an image having the tristimulus values included in the signal generated by output section 126 on a display (step S290). The displayed image makes it easier, for example, when an image used for labels, packages, printed public notices, or the like is produced, for a customer that determines a color tone or the like of the image and a contractor that produces the image having the determined color tone to have the common recognition regarding the to-be-expressed color tone or the like of the image.

According to the present embodiment, since the chromaticity based on the mode including the specular reflection component is weighted in consideration of the directivity that occurs in the spatial distribution of light that is reflected off a glossy color and is then perceived, the effective chromaticity with an increased correlation with the color tone of the glossy color which a person feels with their eyes can be calculated.

Third Embodiment

Figure 8:
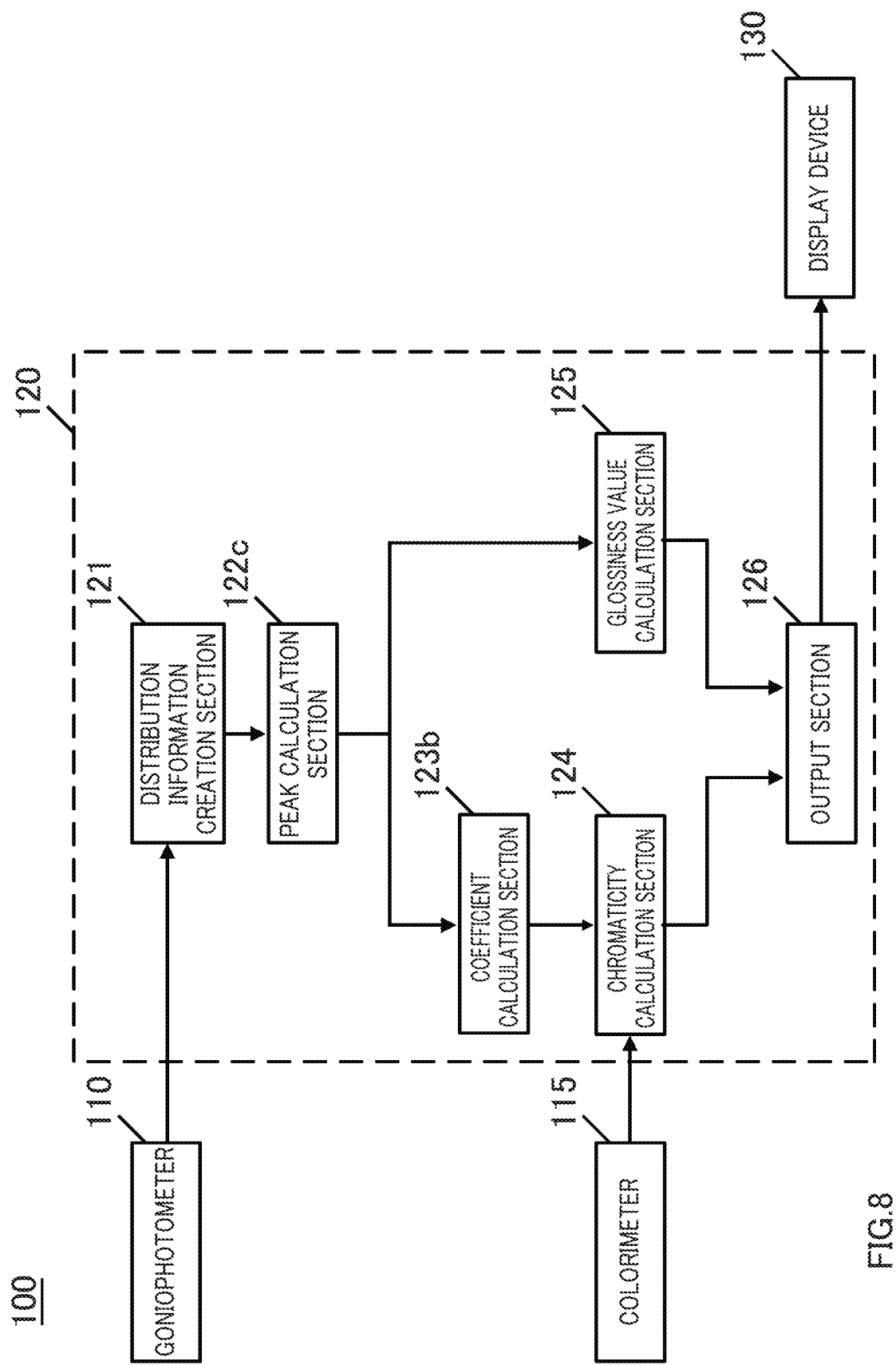
FIG. 8 is a block diagram illustrating an overview of a color tone measurement apparatus for a glossy color according to a third embodiment of the present invention.
Figure 9:
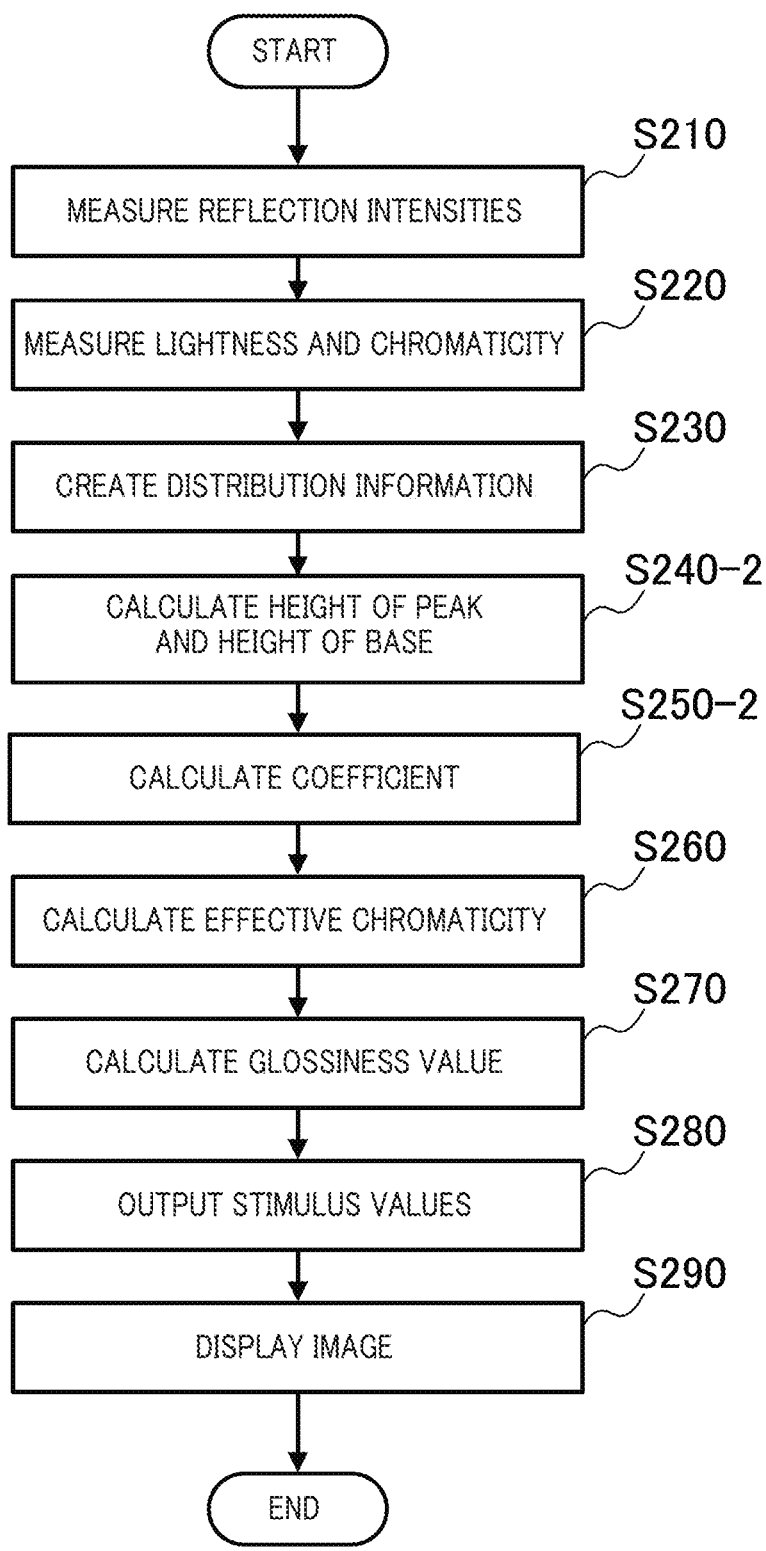
FIG. 9 is a flowchart of a method for measuring a glossiness value of a sample using the color tone measurement apparatus for a glossy color according to the third embodiment of the present invention.

FIG. 8 is a block diagram illustrating an overview of color tone measurement apparatus 100 for a glossy color according to a third embodiment of the present invention. The color tone measurement apparatus according to the third embodiment includes substantially the same components as color tone measurement apparatus 100 according to the second embodiment except that peak calculation section 122c, coefficient calculation section 123c, and chromaticity calculation section 124 have different functions. FIG. 9 is a flowchart of a method for quantifying a color tone of a glossy color of a sample using color tone measurement apparatus 100 according to the third embodiment.

In the present embodiment, peak calculation section 122c fits the distribution information created by distribution information creation section 121 to one function. The function may be any continuous function that is usually used for fitting to the peak shape in a spectrum, and can be any of functions such as a Lorentz function, a Gaussian function, a Voigt function, and a pseudo-Voigt function, for example. It is assumed that also in the present embodiment, peak calculation section 122c fits the distribution information to a Lorentz function.

Peak calculation section 122c may fit the distribution information to the function, and estimate the constants H, $x_s$, W, and B in the function using the least squares method, the maximum likelihood estimation, and the like so that a deviation between the fitted function and the actually measured distribution information (see FIG. 6) decreases. Alternatively, the constants H, $x_s$, W, and B may be estimated using software included in a commercial software package, such as Solver (registered trademark) included in Microsoft Excel (registered trademark) (step S240-2).

Thereafter, coefficient calculation section 123c calculates, as the coefficient, a value expressed by (1+W/90) using the spread W of the peak P calculated by peak calculation section 122c (step S250-2).

The characteristics of the spatial distribution of light that is reflected off the glossy color and is then perceived appear most significantly in the spread of the shape of the peak P. Since the chromaticity based on the mode including the specular reflection component is weighted in consideration of the spread W of the peak P, it is thus considered that the effective chromaticity with an increased correlation with the color tone of the glossy color which a person feels with their eyes can be calculated.

In the present embodiment, chromaticity calculation section 124 weights, based on the coefficient calculated by coefficient calculation section 123c, the chromaticity measured by colorimeter 115 to calculate stimulus values representing the effective chromaticity. In the present embodiment, the effective chromaticity is represented by a stimulus value a* and a stimulus value b* in the CIE 1976 (L*, a*, b*) color space. The effective chromaticity calculated by chromaticity calculation section 124 is hereinafter represented as $a^*_{eff}$ and $b^*_{eff}$.

Specifically, chromaticity calculation section 124 calculates values expressed by expression (6) and expression (7) below using the coefficient calculated by coefficient calculation section 123c from the spread W of the peak calculated by peak calculation section 122c and uses these values as the effective chromaticity $a^*_{eff}$ and $b^*_{eff}$.

[Math. 6]
$$a^*_{eff} = a^*_l\left(1 + \frac{W}{90}\right) \quad \text{Expression (6)}$$

[Math. 7]
$$b^*_{eff} = b^*_l\left(1 + \frac{W}{90}\right) \quad \text{Expression (7)}$$

The effective chromaticity thus determined is close to 1 in a high gloss region since the peak shape becomes sharper and W decreases and, consequently, the correction coefficient (the numerical value in the parentheses) does not become so large. Correction is performed in the above-described manner for the high gloss region so that the chromaticity measured in the mode including the specular reflection component is indicated as it is. Consequently, the influence of light of specular reflection in which much of hue information is collected can be reflected in the chromaticity as it is. Conversely, in a low gloss region, since the peak shape does not become so sharp and W increases, the correction coefficient (the numerical value in the parentheses) becomes relatively large. In this way, the effective chromaticity can be calculated in a manner such that hue information included in light of specular reflection is indicated in a high gloss region and hue information included in the diffuse reflection component is also taken into consideration in a low gloss region.

According to the present embodiment, since the chromaticity based on the mode including the specular reflection component is weighted in consideration of the spread of the shape of the peak P, the effective chromaticity with an increased correlation with the color tone of a glossy color which a person feels with their eyes can be calculated.

Modification of Third Embodiment

After estimating the constants H, $x_s$, W, and B, peak calculation section 122c may evaluate a deviation between the fitted function and the distribution information. If the deviation is within a predetermined allowable range, the process proceeds to calculation of the coefficient performed by coefficient calculation section 123c using the estimated value W and to calculation of the effective chromaticity performed by chromaticity calculation section 124 as in the third embodiment. On the other hand, if the deviation is not allowable, peak calculation section 122c may fit the distribution information to two functions, and estimate the constants H, $x_s$, and W in each of the functions using the least squares method, the maximum likelihood estimation, and the like so that a deviation between the combined value of the two functions and the fitted function decreases. Note that Bs in the respective functions are adjusted to be the same value. The allowable range can be determined in any manner. For example, when a correlation coefficient ($R^2$) of a regression line determined using the least squares method or the like is less than 0.98 or when a p value determined using the Chi-squared test is greater than or equal to a certain value in a graph in which the fitted function and the distribution information are plotted, peak calculation section 122c can fit the distribution information to two functions.

Each of the two functions may be any continuous function that is usually used for fitting to the peak shape in a spectrum, and can be any of functions such as a Lorentz function, a Gaussian function, a Voigt function, and a pseudo-Voigt function, for example. The two functions may be a combination of different functions such as a combination of a Gaussian function and a Lorentz function. From the viewpoint of sufficiently reflecting the region of the base B based on the light of diffuse reflection as well, a combination at least including a Lorentz function is preferable.

Thereafter, coefficient calculation section 123c calculates, as the coefficient, $(1+W_{ave}/90)$ using an average value $W_{ave}$ of peak widths $W_1$ and $W_2$ respectively determined from the two functions. Then, chromaticity calculation section 124 corrects, using the determined coefficient, the chromaticity measured by colorimeter 115.

According to the present modification, since the accuracy of fitting is increased, the effective chromaticity with an increased correlation with the color tone of a glossy color which a person feels with their eyes can be calculated.

Fourth Embodiment

A color tone measurement apparatus according to a fourth embodiment of the present invention includes substantially the same components as color tone measurement apparatus 100 according to the first embodiment, the second embodiment, the third embodiment, or the modification of the third embodiment except that glossiness value calculation section 125 has different functions.

In the present embodiment, glossiness value calculation section 125 calculates the glossiness value using the height or area of the peak P and the spread of the peak P that are calculated by peak calculation section 122b or peak calculation section 122c.

The height of the peak P may be a value of the lightness or reflection intensity (height of the peak in the graph) at the light reception angle corresponding to the peak P. The spread of the peak P is usually a value determined in consideration of the height of the base B, such as by setting the half-value width based on the height of the peak P relative to the height of the base B, for example. Accordingly, from the viewpoint of achieving matching with the spread of the peak P, the height of the peak P may be a difference between the value of the lightness or reflection intensity at the peak P and the value of the lightness or reflection intensity at the base B. According to the knowledge of the inventors, the height of the peak P is preferably a value of the lightness or reflection intensity (height of the peak in the graph) at the light reception angle corresponding to the peak P among these.

The area of the peak P may be an area of the peak P from a base start (which is a point where an increasing rate relative to the base line becomes greater than or equal to a predetermined level) to a base end (which is a point where the increasing rate relative to the base line becomes less than or equal to the predetermined level), may be an area from a peak start to a peak end (each of which is a point where the lightness or reflection intensity between adjacent peaks becomes the smallest), or may be an area within a range of a half-value width including the half width at half maximum and the full width at half maximum of the peak P.

The spread of the peak P may be the half-value width including the half width at half maximum and the full width at half maximum of the peak P, or may be an interval between a plurality of inflection points that appear at different light reception angles in expression obtained by fitting a polynomial function to the distribution information.

Figure 10B:
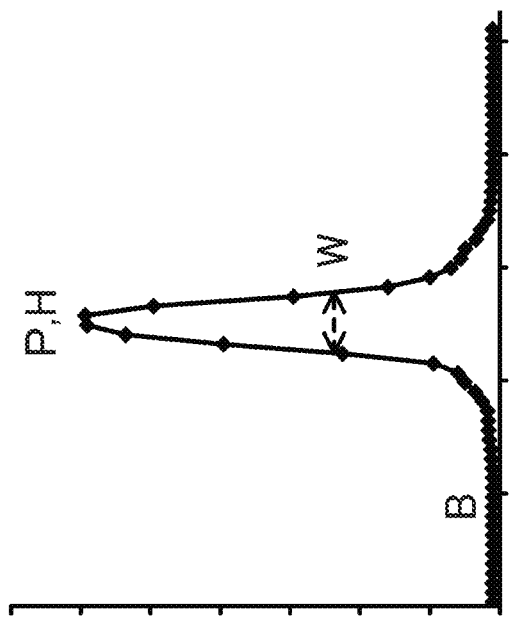
FIG. 10B is a graph describing the state in FIG. 10A in terms of FIG. 7.
Figure 10A:
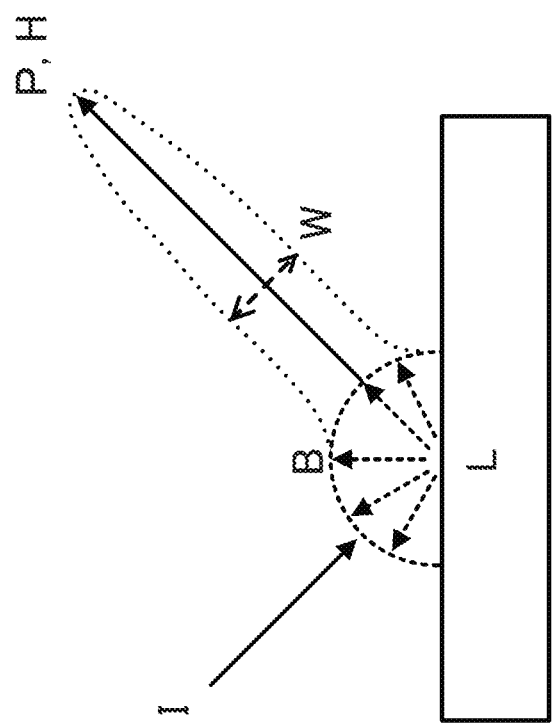
FIG. 10A is a schematic diagram illustrating a state in which part of incident light that is incident onto an object becomes light of specular reflection and another part becomes light of diffuse reflection.

According to the knowledge of the inventors, the degree of glossiness of an object perceived by an observer is influenced by a degree at which the lightness or reflection intensity of reflected light which is light that is reflected off the object after being incident onto the object is distributed densely at an angle of specular reflection (directivity of the spatial distribution). Thus, in the present embodiment, the glossiness value is a scale indicating the directivity of the spatial distribution and is a value expressed based on a ratio of the height or area of the peak P to the spread of the peak P. As illustrated in FIG. 10A, part of incident light I that is incident onto an object becomes light P of specular reflection and part of the indent light I becomes light B of diffuse reflection (In FIG. 10A, the lightness or reflection intensity of the light P of specular reflection and the lightness or reflection intensity of the light B of diffuse reflection are represented by distances from a point L onto which the incident light I is incident (length of a solid-line arrow representing the light P of specular reflection and lengths of broken-line arrows representing the light B of diffuse reflection). Note that the lightnesses or reflection intensities of the light P and the light B are adjusted for ease of understanding and the actually measured and calculated lightnesses or reflection intensities are not accurately reflected). The distribution of the lightness or reflection intensity of the reflected light at the angle of specular reflection can be expressed by a ratio of the lightness or reflection intensity of the reflected light P of specular reflection to the half-value width W of the peak of the reflected light of specular reflection, which is illustrated in FIG. 10B.

Specifically, in the present embodiment, glossiness value calculation section 125 calculates a value expressed by expression (8), expression (9), expression (10), expression (11), expression (12), expression (13), or expression (14) below, preferably by expression (9), expression (10), expression (12), or expression (13), more preferably by expression (9) or expression (12) using the height H of the peak relative to the base B, the half-value width W of the peak, and the height B of the base that are calculated by peak calculation section 122b or peak calculation section 122c, and uses this value as the glossiness value.

[Math. 8]
$$\text{Glossiness value} = \frac{|H - B|}{W} \quad \text{Expression (8)}$$

[Math. 9]
$$\text{Glossiness value} = \log\frac{|H - B|}{W} \quad \text{Expression (9)}$$

[Math. 10]
$$\text{Glossiness value} = \frac{\log(|H - B|)}{W} \quad \text{Expression (10)}$$

[Math. 11]
$$\text{Glossiness value} = \frac{|H - B|}{\log W} \quad \text{Expression (11)}$$

[Math. 12]
$$\text{Glossiness value} = \left(\frac{|H - B|}{W}\right)^x \quad \text{Expression (12)}$$

[Math. 13]
$$\text{Glossiness value} = \frac{(|H - B|)^x}{W} \quad \text{Expression (13)}$$

[Math. 14]
$$\text{Glossiness value} = \frac{|H - B|}{W^x} \quad \text{Expression (14)}$$

In expression (12) to expression (14), x represents a constant determined in any manner. In addition, in expression (8) to expression (14), the height (H–B) of the peak P is an absolute value.

Alternatively, glossiness value calculation section 125 calculates a value expressed by expression (15), expression (16), expression (17), expression (18), expression (19), expression (20), or expression (21) below, preferably by expression (16), expression (17), expression (19), or expression (20), more preferably by expression (16) or expression (19) using the height (H) of the peak relative to the base B and the half-value width (W) of the peak that are calculated by peak calculation section 122b or peak calculation section 122c, and uses this value as the glossiness value.

[Math. 15]
$$\text{Glossiness value} = \frac{H}{W} \quad \text{Expression (15)}$$

[Math. 16]
$$\text{Glossiness value} = \log\frac{H}{W} \quad \text{Expression (16)}$$

[Math. 17]
$$\text{Glossiness value} = \frac{\log H}{W} \quad \text{Expression (17)}$$

[Math. 18]
$$\text{Glossiness value} = \frac{H}{\log W} \quad \text{Expression (18)}$$

-continued

[Math. 19]
$$\text{Glossiness value} = \left(\frac{H}{W}\right)^x \quad \text{Expression (19)}$$

[Math. 20]
$$\text{Glossiness value} = \frac{H^x}{W} \quad \text{Expression (20)}$$

[Math. 21]
$$\text{Glossiness value} = \frac{H}{W^x} \quad \text{Expression (21)}$$

In expression (19) to expression (21), x represents a constant determined in any manner.

Alternatively, in the present embodiment, glossiness value calculation section 125 calculates a value expressed by expression (22), expression (23), expression (24), expression (25), expression (26), expression (27), or expression (28) below, based on a function (f(x)) to which the distribution information is fitted by peak calculation section 122*b* or peak calculation section 122*c*, and uses this value as the glossiness value.

[Math. 22]
$$\text{Glossiness value} = \frac{\int_a^b f(x)dx}{W_e} \quad \text{Expression (22)}$$

[Math. 23]
$$\text{Glossiness value} = \log\frac{\int_a^b f(x)dx}{W_e} \quad \text{Expression (23)}$$

[Math. 24]
$$\text{Glossiness value} = \frac{\log\int_a^b f(x)dx}{W_e} \quad \text{Expression (24)}$$

[Math. 25]
$$\text{Glossiness value} = \frac{\int_a^b f(x)dx}{\log w_e} \quad \text{Expression (25)}$$

[Math. 26]
$$\text{Glossiness value} = \left(\frac{\int_a^b f(x)dx}{W_e}\right) \quad \text{Expression (26)}$$

[Math. 27]
$$\text{Glossiness value} = \frac{\left(\int_a^b f(x)dx\right)^x}{W_e} \quad \text{Expression (27)}$$

[Math. 28]
$$\text{Glossiness value} = \frac{\int_a^b f(x)dx}{w_e^x} \quad \text{Expression (28)}$$

In expression (22) to expression (28), a and b represent values of light reception angles at the respective ends of the peak. For example, a can be set as $(x_0-W/2)$ and b can be set as $(x_0+W/2)$ ($x_0$ represents the light reception angle of the peak P and is typically an angle of specular reflection). In the present embodiment, in expression (22) to expression (28), $W_e$ is the same value as the half-value width (W). In addition, in expression (22) to expression (28), the area of the peak P is determined by integrating the height (H) of the peak P. Alternatively, the area of the peak P may be determined by integrating the absolute value of the difference between the height (H) of the peak P and the height (B) of the base.

The glossiness value expressed in this manner increases as the lightness or reflection intensity of the light P of specular reflection increases, and increases as the region of the light including the light P of specular reflection and having strong lightness or reflection intensity narrows. Glossiness value calculation section 125 may use a non-logarithmic value as the glossiness value. However, when a logarithmic value of at least one element (such as (H–B) or (H–B)/W) constituting the ratio as indicated by expression (9) to expression (11), expression (16) to expression (18), and expression (23) to expression (25), or a power value of at least one element (such as (H–B) or (H–B)/W) constituting the ratio as indicated by expression (12) to expression (14), expression (19) to expression (21), and expression (26) to expression (28) is used as the glossiness value, a correlation with the glossiness which a person feels with their eyes is further increased.

It is considered that the correlation is further increased for the glossiness values calculated using expression (9) to expression (11), expression (16) to expression (18), and expression (23) to expression (25) above since re-correction is performed by determining a logarithm in accordance with the Weber-Fechner law (law that a human sensation perceives a change in stimulus quantity which as a physical quantity, as a quantity that is proportional to the logarithm of the change) so the result approaches the perception of a person. It is also considered that the correlation is further increased for the glossiness values calculated using expression (12) to expression (14), expression (19) to expression (21), and expression (26) to expression (28) above since re-correction is performed by determining a power in accordance with Stevens's power law (law that a human sensation perceives a change in stimulus quantity which as a physical quantity, as a quantity that is proportional to the power of the change) so that the result approaches the perception of a person.

When the area of the peak P is determined by integrating the height of the peak P and the glossiness value is represented by a ratio of the area of the peak P to the spread (W) of the peak P as in expression (22) to expression (28), a correlation of the glossiness value determined particularly for a low gloss image with the glossiness which a person feels with their eyes is further increased.

Note that when fitting the distribution information to one function, glossiness value calculation section 125 may calculate the glossiness value using H and B which are estimated from the function.

In addition, when fitting the distribution information to two functions, glossiness value calculation section 125 may calculate, as the glossiness value, a sum value of the glossiness values determined using H and B which are estimated from the respective functions. Alternatively, glossiness value calculation section 125 may calculate the glossiness value using expression (29) below in consideration of contributions of the two functions to the appearance of the sample.

[Math. 29]

$$\text{Glossiness value} = \log\left(\frac{|H_1 + H_2 + B|}{c_1 W_1 + c_2 W_2}\right) \quad \text{(Expression 29)}$$

In expression (29), $H_1$ and $W_1$ represent the constants H and W estimated from a first function, respectively, and $H_2$ and $W_2$ represent the constants H and W estimated from a second function, respectively. A constant $c_1$ represents a contribution of the first function, and a constant $c_2$ represents a contribution of the second function. For example, the contributions of the first function and the second function may be regarded to be equal and $c_1$ and $c_2$ may be set to ½, or $c_1$ and $c_2$ may be set as in expression (30) and expression (31) below on the assumption that the height of the peak contributes to the glossiness.

[Math. 30]

$$c_1 = \frac{H_1}{H_1 + H_2 + B} \quad \text{Expression (30)}$$

[Math. 31]

$$c_2 = \frac{H_2}{H_1 + H_2 + B} \quad \text{Expression (31)}$$

Other Embodiments

Note that each of the embodiments described above merely indicates an example of how to embody the present invention, and that the technical scope of the present invention should not be construed limitedly by these. That is, the present invention can be carried out in various forms without departing from the gist thereof or from the major features thereof.

For example, in the second embodiment, the third embodiment, and the fourth embodiment, the distribution information is created by a glossiness value calculation apparatus. Alternatively, the goniophotometer may create the distribution information, and the glossiness value calculation apparatus may calculate the height of the peak, the spread of the peak, the area of the peak, and the height of the base, based on the distribution information created by the goniophotometer.

In addition, in the second embodiment, the third embodiment, and the fourth embodiment, the height (H) of the peak relative to the base B, the height (B) of the base, and the spread of the peak may be determined directly from coordinate values without performing fitting to the function(s).

Further, the output section may output the effective chromaticity alone, or may output the glossiness value and the effective chromaticity in combination.

Moreover, the calculated tristimulus values in the color space can be used as reference information for forming an image having the tristimulus values on paper, plastic, metal, glass, textile, and so on.

EXAMPLES

Specific examples of the present invention will be described below along with comparative examples. Note that the present invention is not limited to these.

1. Measurement of Chromaticity 1-1. Test 1

Gold leaves (No. 2, No. 3, No. 6, No. 9, No. 10, No. 26, No. 101, No. 102, No. 108, and No. 111) available from MURATA KIMPAKU Co., Ltd. were prepared.

Lightness measured in the mode including the specular reflection component and lightness measured in the mode excluding the specular reflection component (both corresponding to L* in the CIE 1976 (L*, a*, b*) color space) of each gold leaf were determined using a colorimeter (SP62 available from X-Rite Inc.) including an integrating sphere.

The effective chromaticity $a^*_{eff}$ and $b^*_{eff}$ of each gold leaf was calculated using expression (1) and expression (2) below from the obtained chromaticity and lightness. Note that $L^*_{max}$ is set to 100.

[Math. 32]

$$a^*_{eff} = a^*_I\left(1 + \frac{L^*_I + L^*_E}{2 \times L^*_{MAX}}\right) \quad \text{Expression (1)}$$

[Math. 33]

$$b^*_{eff} = b^*_I\left(1 + \frac{L^*_I + L^*_E}{2 \times L^*_{MAX}}\right) \quad \text{Expression (2)}$$

1-2. Test 2

Chromaticity (a* and b* in the CIE 1976 (L*, a*, b*) color space) of each gold leaf measured in the mode including the specular reflection component was determined using a colorimeter (SP62 available from X-Rite Inc.) including an integrating sphere.

Reflection intensities at −20° to 80° was measured at intervals of 5° in a range from −20° to 0°, at intervals of 2° in a range from 0° to 30°, at intervals of 1° in a range from 30° to 60°, and at intervals of 2° in a range from 80° to 80° using a goniophotometer (product name: GCMS-4 available from MURAKAMI COLOR RESEARCH LABORATORY CO., LTD.) while the light reception angle is changed and each sample of the glossiness value measurement method is irradiated with incident light at the incident angle of 45°. Reflectance was calculated from the reflection intensity obtained at each light reception angle, and a reflection spatial distribution profile indicating a relationship between the light reception angle and the reflectance was obtained.

The shape of the obtained reflection spatial distribution profile was fitted to two Lorentz functions, and the heights $H_1$ and $H_2$ of the peak relative to the base and the height B of the base according to the respective functions were determined using the least squares method and Solver (registered trademark) included in Microsoft Excel (registered trademark).

The effective chromaticity $a^*_{eff}$ and $b^*_{eff}$ of each gold leaf was calculated using expression (4) and expression (5) below from the obtained chromaticity, heights $H_1$ and $H_2$ of the peak, and height B of the base.

[Math. 34]

$$a^*_{eff} = a^*_I\left(1 + \frac{H_2}{H_1 + H_2 + B}\right) \quad \text{Expression (4)}$$

[Math. 35]

$$b^*_{eff} = b^*_I\left(1 + \frac{H_2}{H_1 + H_2 + B}\right) \quad \text{Expression (5)}$$

1-3. Test 3

Chromaticity (a* and b* in the CIE 1976 (L*, a*, b*) color space) of each gold leaf measured in the mode including the specular reflection component was determined using a colorimeter (SP62 available from X-Rite Inc.) including an integrating sphere.

Reflection intensities at −20° to 80° was measured at intervals of 5° in a range from −20° to 0°, at intervals of 2° in a range from 0° to 30°, at intervals of 1° in a range from 30° to 60°, and at intervals of 2° in a range from 80° to 80° using a goniophotometer (product name: GCMS-4 available from MURAKAMI COLOR RESEARCH LABORATORY CO., LTD.) while the light reception angle is changed and each sample of the glossiness value measurement method is irradiated with incident light at the incident angle of 45°. Reflectance was calculated from the reflection intensity obtained at each light reception angle, and a reflection spatial distribution profile indicating a relationship between the light reception angle and the reflectance was obtained.

Reflection intensities at −20° to 80° was measured at intervals of 5° in a range from −20° to 0°, at intervals of 2° in a range from 0° to 30°, at intervals of 1° in a range from 30° to 60°, and at intervals of 2° in a range from 60° to 80° using a goniophotometer (product name: GCMS-4 available from MURAKAMI COLOR RESEARCH LABORATORY CO., LTD.) while the light reception angle is changed and each sample of the glossiness value measurement method is irradiated with incident light at the incident angle of 45°. Reflectance was calculated from the reflection intensity obtained at each light reception angle, and a reflection spatial distribution profile indicating a relationship between the light reception angle and the reflectance was obtained.

The shape of the obtained reflection spatial distribution profile was fitted to one Lorentz function, and the half-value width W of the peak was determined using the least squares method and Solver (registered trademark) included in Microsoft Excel (registered trademark).

The effective chromaticity $a^*_{\it eff}$ and $b^*_{\it eff}$ of each gold leaf was calculated using expression (6) and expression (7) below from the obtained chromaticity and half width at half maximum W of the peak.

[Math. 36]

$$a^*_{\it eff} = a^*_I\left(1 + \frac{W}{90}\right) \quad \text{Expression (6)}$$

[Math. 37]

$$b^*_{\it eff} = b^*_I\left(1 + \frac{W}{90}\right) \quad \text{Expression (7)}$$

1-4. Test 4

Lightness of each gold leaf measured in the mode including the specular reflection component was determined using a colorimeter (SP62 available from X-Rite Inc.) including an integrating sphere, and the chromaticity $a^*_I$ and $b^*_I$ of each experiment sample was determined.

1-5. Test 5

Lightness of each gold leaf measured in the mode excluding the specular reflection component was determined using a colorimeter (SP62 available from X-Rite Inc.) including an integrating sphere, and the chromaticity $a^*_E$ and $b^*_E$ of each experiment sample was determined.

2. Measurement of Sensation Quantity

A sensitivity test was performed by twelve persons in total including two males and two females in their twenties, two males and two females in their thirties, and two males and two females in their forties.

Each gold leaf used in the measurement of the glossiness value was cut into a square measuring 15 mm or greater per side. The square gold leaf was adhered to matte wood-free paper (kenran: snow available from FUJIKYOWA SEISHI Corporation) cut into a square measuring 30 mm per side, and the resultant article was covered from the above with a mask (kenran: snow available from FUJIKYOWA SEISHI Corporation) having a square cut measuring 15 mm per side. The resultant article is used as the experiment sample.

A light source device (Judge II from Gretag Macbeth Company) was installed in a room to which no sunlight is incident. The sample was shown to each subject under the D50 light source to prompt the subject to rate a score from 0 to 20 according to the degree to which the subject feels "redness", and the obtained value was used as the sensed glossiness value.

3. Evaluation

A graph was created in which the sensed glossiness value was plotted with respect to the horizontal axis and the effective chromaticity ($a^*_{\it eff}$) or chromaticity ($a^*_I$ or $a^*_E$) obtained in each of the test 1 to the test 5 was plotted with respect to the vertical axis, and the correlation coefficient ($R^2$) of the regression line was determined. Table 1 illustrates the result.

TABLE 1

| Vertical axis | Correlation coefficient ($R^2$) | Note |
|---|---|---|
| Test 1 | 0.897 | First embodiment |
| Test 2 | 0.904 | Second embodiment |
| Test 3 | 0.907 | Third embodiment |
| Test 4 | 0.895 | $a^*_I$ |
| Test 5 | 0.013 | $a^*_E$ |

The effective chromaticity $b^*_{\it eff}$ was determined for $b^*$ in substantially the same manner. A tendency was confirmed that the correlation with the chromaticity which a person feels with their eyes is increased for the effective chromaticity $b^*_{\it eff}$ corrected according to the concepts of the first embodiment to the third embodiment.

Table 1 indicates that the correlation with the chromaticity which a person feels with their eyes is increased for the effective chromaticity according to each embodiment of the present invention.

This application claims priority from Japanese Patent Application No. 2018-049580, filed Mar. 16, 2018, the contents of which are incorporated herein in its entirety.

INDUSTRIAL APPLICABILITY

According to the present invention, a color tone quantification method for a glossy color that increases a correlation with the color tone of a glossy color which a person feels with their eyes is provided. Therefore, the present invention is expected to make it easier to transmit and share information regarding a glossy color in printing and advertising industries.

REFERENCE SIGNS LIST

100 color tone measurement apparatus
110 goniophotometer
115 colorimeter
120 color tone quantification apparatus
121 distribution information creation section
122b, 122c peak calculation section 123a, 123b, 123c coefficient calculation section
124 chromaticity calculation section
125 glossiness value calculation section
126 output section
130 display device
310 bluish gold
320 reddish gold
330 matte gold

The invention claimed is:

1. A color tone quantification apparatus for a glossy color, comprising:
   a coefficient calculation section that calculates a coefficient for use in correction of chromaticity measured in a mode including a specular reflection component, the chromaticity being obtained from measurement of reflected light that is measurement light which a region of an object is irradiated with and which is reflected off the region, the coefficient being calculated in consideration of a spatial distribution of the reflected light;
   a chromaticity calculation section that calculates effective chromaticity that is the chromaticity measured in the mode including the specular reflection component weighted by the coefficient calculated by the coefficient calculation section; and
   an output section that outputs the effective chromaticity as a stimulus value representing a glossy color of the region in a color space.

2. The color tone quantification apparatus for a glossy color according to claim 1, wherein the coefficient calculation section calculates the coefficient using an expression that makes the coefficient decrease when the reflected light includes more specular reflection component and makes the coefficient increase when the reflected light includes more diffuse reflection component.

3. The color tone quantification apparatus for a glossy color according to claim 1, wherein the coefficient calculation section calculates the coefficient using at least one of a height (H) of a peak, a height (B) of a base, and a spread (W) of the peak of lightness or reflection intensity in distribution information of the lightness or reflection intensity with respect to a light reception angle, the lightness or reflection intensity being obtained measurement of the reflected light that is the measurement light which the region of the object is irradiated with and which is reflected off the region.

4. The color tone quantification apparatus for a glossy color according to claim 3, further comprising:
   a peak calculation section that fits the distribution information to a function and determines at least one of the height (H) of the peak, the height (B) of the base, and the spread (W) of the peak of the lightness or reflection intensity.

5. The color tone quantification apparatus for a glossy color according to claim 4, wherein the function is a function selected from the group consisting of a Lorentz function, a Gaussian function, a Voigt function, and a pseudo-Voigt function.

6. The color tone quantification apparatus for a glossy color according to claim 3, wherein the coefficient calculation section calculates the coefficient using the spread (W) of the peak of the lightness or reflection intensity in the distribution information.

7. The color tone quantification apparatus for a glossy color according to claim 6, wherein the spread (W) of the peak is a half-value width of the peak of the lightness or reflection intensity in the distribution information.

8. The color tone quantification apparatus for a glossy color according to claim 1, further comprising:
   a glossiness value calculation section that calculates a glossiness value of the region, wherein
   the output section outputs the effective chromaticity and the glossiness value in combination, as the stimulus value representing the glossy color of the region in the color space.

9. The color tone quantification apparatus for a glossy color according to claim 8, wherein the glossiness value calculation section calculates, as the glossiness value, a ratio of a height or area of a peak of lightness or reflection intensity to a spread of the peak of the lightness or reflection intensity in distribution information of the lightness or reflection intensity with respect to a light reception angle, the lightness or reflection intensity being obtained from measurement of the reflected light that is the measurement light which the region of the object is irradiated with and which is reflected off the region.

10. The color tone quantification apparatus for a glossy color according to claim 1, wherein the output section generates a signal for reproducing, on a display device, an image having the glossy color represented by the stimulus value output by the output section.

11. A color tone measurement apparatus for a glossy color, comprising:
    a goniophotometer that measures, at a plurality of light reception angles different from one another, radiant intensities of reflected light that is measurement light which a region of an object is irradiated with and which is reflected off the region;
    a colorimeter that measures chromaticity of the region onto which the measurement light is incident in the object; and
    the color tone quantification apparatus for a glossy color according to claim 1.

12. A color tone quantification method for a glossy color, comprising:
    calculating a coefficient for use in correction of chromaticity measured in a mode including a specular reflection component, the chromaticity being obtained from measurement of reflected light that is measurement light which a region of an object is irradiated with and which is reflected off the region, the coefficient being calculated in consideration of a spatial distribution of the reflected light;
    calculating effective chromaticity that is the chromaticity measured in the mode including the specular reflection component weighted by the coefficient calculated in the calculating of the coefficient; and
    outputting the effective chromaticity as a stimulus value representing a glossy color of the region in a color space.

* * * * *